United States Patent [19]

Carroll

[11] Patent Number: 4,521,645

[45] Date of Patent: Jun. 4, 1985

[54] FIRE ALARM SYSTEM

[76] Inventor: Robert A. Carroll, 441 Neatherwood Crescent Dr., Altamonte Springs, Fla. 32701

[21] Appl. No.: 505,371

[22] Filed: Jun. 16, 1983

[51] Int. Cl.$^3$ ............................................ H04M 11/04
[52] U.S. Cl. ..................................... 179/5 R; 340/525
[58] Field of Search ................. 179/5 R, 5 P; 340/525

[56] References Cited

U.S. PATENT DOCUMENTS

| 4,141,006 | 2/1979 | Braxton | 179/5 R X |
| 4,259,548 | 3/1981 | Fahey et al. | 179/5 R |
| 4,459,582 | 7/1984 | Sheahan et al. | 179/5 R X |

FOREIGN PATENT DOCUMENTS

| 54-55398 | 5/1979 | Japan | 340/525 |
| WO81/02657 | 9/1981 | PCT Int'l Appl. | 179/5 R |

OTHER PUBLICATIONS

John T. Boatwright, "Alarm Reporting Services: An Untapped TELCO Market", *Telephony*, Sep. 14, 1981; pp. 74, 76, 78, 81.

Rémy Brodeur, "A Microcomputer Based Alarms Concentration System," 1980 International Conference: Security Through Science and Engineering, Sep. 23-26, 1980, Technical University of Berlin, Federal Republic of Germany, pp. 293-296.

*Primary Examiner*—Keith E. George
*Attorney, Agent, or Firm*—William M. Hobby, III

[57] ABSTRACT

An alarm system apparatus includes a plurality of sets of smoke or heat detectors located throughout a building. A plurality of automatic telephone dialers are also located in the building and each dialer has at least one set of smoke or heat detectors operatively connected thereto. A plurality of localized alarms are connected to the automatic dialer for actuation by the detectors and each automatic dialer is connected to a phone line into a microcomputer having stored thereon the position of each smoke and heat detector. The microcomputer, in turn, has a modem coupling it through the phone lines to a remote terminal. The microcomputer includes a connector for coupling a mobile terminal to the computer from the exterior of the building. In addition, the auto dialer is equipped with a relay for switching in an auxiliary battery supply in the event of power loss.

12 Claims, 2 Drawing Figures

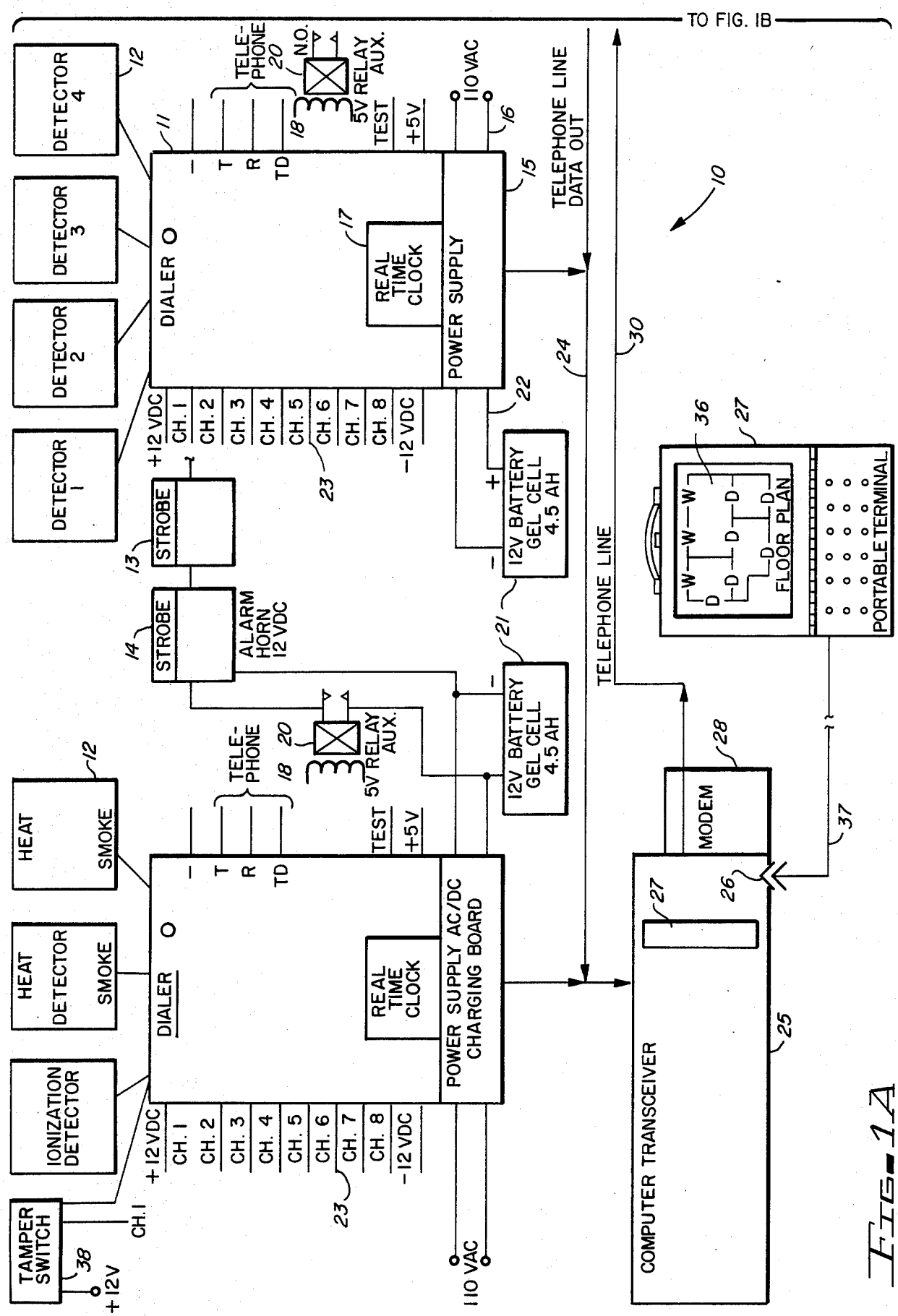

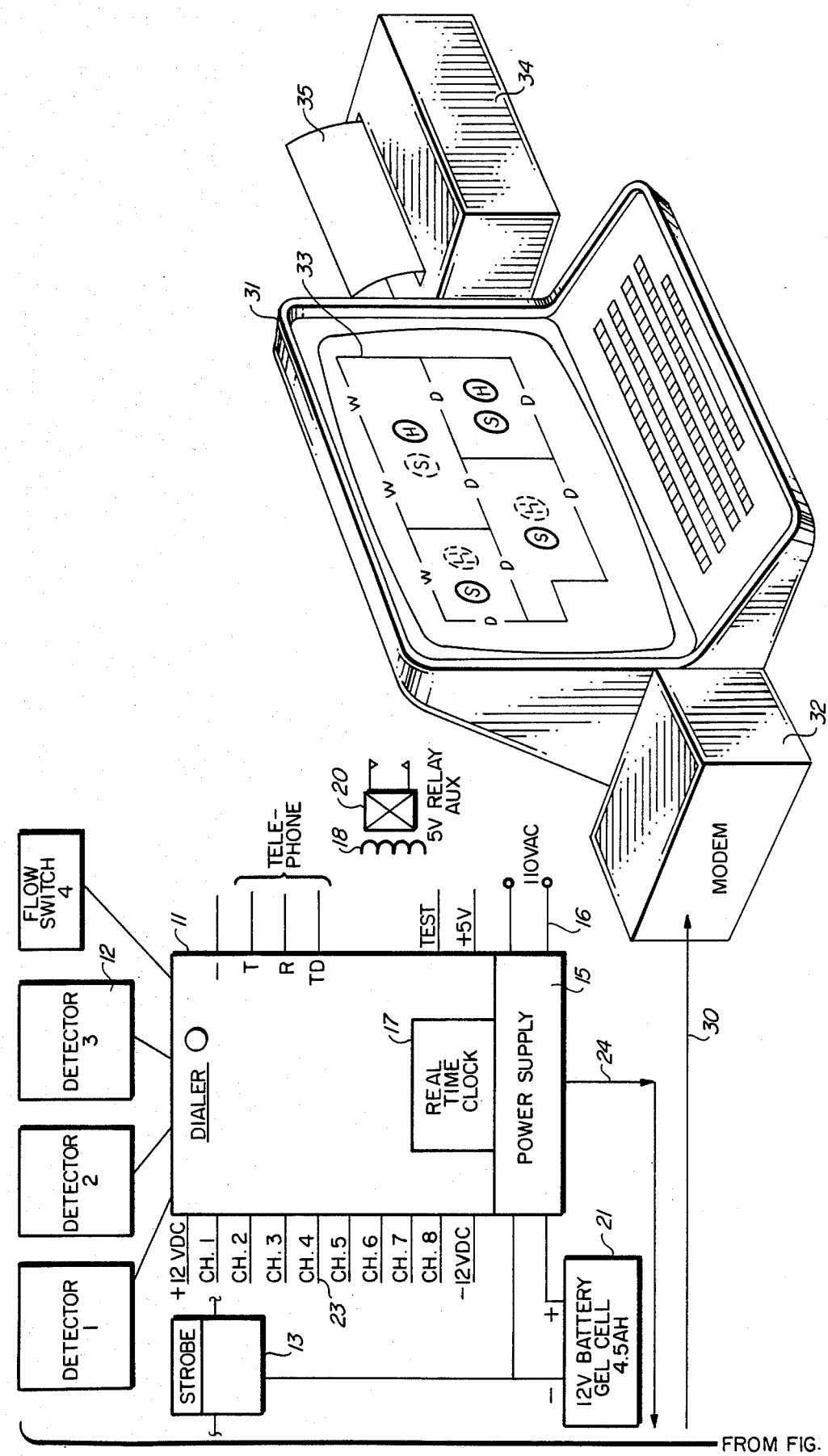
FIG_1B

FIRE ALARM SYSTEM

BACKGROUND OF THE INVENTION

The present invention relates to building alarm systems and especially to a building alarm system adapted to give a localized alarm as well as a remote alarm providing more detailed information about the location of each actuated fire detector in a building.

In the past, it has been common to provide various types of fire alarm systems for large buildings, as well as smaller buildings and residences. In the simplist system, a smoke or heat detector is battery operated to actuate a small electronic sound alarm for placing in homes to alert or awaken occupants. In larger buildings, it has been more customary to provide sprinkler systems on some or all of the floors which are typically actuated by heat to sprinkle water in any area where the heat rises above a certain level. Such systems may also be actuated by smoke, but have the disadvantage that the water from the sprinkler system frequently does more damage than the smoke or fire, and very typically, does not have a warning system for occupants in the building.

Prior art fire alarm systems also provide for pull stations to report a fire to a fire station, and usually report a fire only by zone. Most systems are dependent on the available line voltage as part of their operation. An electrical fire's power to the alarm system is sometimes lost, so that an alarm is not given until individually reported. These systems also can be shut down or overriden. Most do not provide detectors throughout a building, but only in isolated areas and without built in alarms to warn people in other parts of the building. The present invention, on the other hand, is directed towards a system which is fully automatic and which can detect a fire in any part of a building and thereafter notify the fire department without the need of human participation. The system is low voltage throughout with separate battery backups having a trickle charger connected to the line voltage. The use of automatic telephone dialers, which are commonly available, to generate a signal to a small microcomputer which stores the location of the detector being actuated, produces advance information of the specific location of a fire and where it is spread to, in addition to giving a localized alarm and advising the fire department, police or rescue teams of the position of the fire. The system also gives the layout of each floor of the building so that rapid rescue and fire extinguishing activities can take place.

An advantage of the present system is its ease of retrofit installation, along with its low cost of installation compared with conventional systems used in large buildings and the provision for the operation of the alarms even in the event of line voltage failure.

SUMMARY OF THE INVENTION

The present invention relates to an alarm system which includes a plurality of smoke or heat detectors and may include burglar alarm detectors. Each of the detectors is connected to an automatic dialer positioned in a building to transmit the actuation of a detector to local alarms as well as to a building microcomputer having stored therein the position of each detector and the floor plan of each floor of the building and which communicates the information over telephone lines to the nearest fire station or to a central monitoring station. The system operates on a low voltage and has an auxiliary battery as a power source, in the event of line voltage failure. The system provides for both a central terminal connection and a portable terminal connection for connecting to the building microcomputer at a connector from exterior of the building to provide a fire chief with up-to-the-date information on which detectors have been actuated and their position on each floor to enable more rapid rescue and fire extinguishment.

BRIEF DESCRIPTION OF THE DRAWINGS

Other objects, features and advantages of the present invention will be apparent from the written description and the drawings, in which:

FIGS. 1A and 1B form a block diagram of an alarm system in accordance with the present invention.

DESCRIPTION OF THE PREFERRED EMBODIMENT

Referring to the drawing, a fire alarm system 10 is shown as a block and schematic diagram having a plurality of solid state automatic telephone dialers 11. Each floor of a building, for instance, can have one automatic dialer 11 placed thereon and connected to a plurality of heat and smoke detectors 12. It is anticipated that combination heat and smoke detectors will be utilized, even though either smoke or heat detectors can be utilized separately, and in addition, a burglar alarm detector can be connected to the auto dialer in the same manner as a smoke detector. Each automatic dialer is connected to a plurality of localized strobe warning lights 13 and 12-volt alarm horns 14 for immediately notifying anyone in the vicinity of where the detector has been activated. The automatic dialer 11 is connected by a power supply 15 which includes a transformer for lowering the 110-volt AC being supplied by the voltage line 16 to a 12-volt DC using a transformer and rectifier circuit. Solid state dialers 11 are commercially available, as are the power supplies 15. Each automatic dialer 11 also has a real time clock 17 incorporated therein for providing a means for the dialer reporting station to periodically test dial to the computer. To prove the integrity of its circuit, the computer keeps track of alarm times. A relay 18 is connected to a battery 20 and is actuated upon the loss of the line voltage over the line 16 to connect the operation of the dialer 11 to the batteries 20.

In addition, the strobe 13 and alarm horn 14 are connected to a 12-volt gel cell battery 21 which is connected to the lines 22 and to the power supply 15 for continuously charging the gel cell batteries to operate the alarm horn and strobe irrespective of the line voltage 16. The automatic dialer 11 has a plurality of channels 23 which are connected to the strobes and alarm horns and can be used to connect to the detectors 12. Each automatic dialer 11 is connected through the telephone line 24 and once the telephone electronic dialer is activated it will seize the telephone line and dial by either touch tone or rotary or pulse dialing, a preprogrammed number which is preprogrammed into a ROM or PROM memory chip in the dialer and transmits the information directly into the building computer 25. The PROM memory, which is part of the automatic dialer, has been programmed with an extra four digits to indicate which channel and detector has been actuated. The computer 25 has a monitor coupling 26 which is positioned on the outside of the building for attaching a portable terminal 27. Each computer also has a storage disk, such as a Winchester or hard disk drive 27, and a built in modem 28. The storage disk 27 already has the data stored thereon of the layout for each floor of the building and the position of each detector on each floor so that the information received from the automatic dialer will immediately indicate which detector in which room of which floor has been actuated by the application of this information from each floor to the disk. The stored information, including which detector has been actuated, is transmitted any time a signal is received from any of the automatic dialers 11 and the computer 25 over the telephone line 30 to a remote terminal 31 which may be located in a fire station or a central monitoring station through the monitor 31 modem 32. The terminal 31 has a CRT screen 33 which can display the floor layout and indicates which detector has been actuated and the location of the building and floor. The central terminal 33 will indicate an acoustic, as well as a visual alarm and may be connected to a printer 34 for giving an immediate printed report 35. Upon the fire station or police arriving at the site where the detectors have been actuated, the portable terminal 27 can be plugged into the coupling 26 to the computer 25 and a CRT display 36 will display the floor plan of the floor where the fire or smoke is located and the specific detector locations, so that the firemen or rescue team knows exactly which floor and which rooms the fire and smoke are located in.

The remote terminal 27 can also include a long cable 37 which can be connected to the coupling 26 and extended a distance away from the building for monitoring the progress of the fire. The use of a central computer 25 with a large storage capacity and a disk drive 27 allows additional information to be stored as desired, such as information on stand pipes and sprinklers, the location of hydrants, water pressure, phone numbers of people to notify, as well as utility phone numbers and the location of personnel or dangerous or flammable chemicals or other storage in the building which can be accessed by the terminal 27. The automatic telephone dialers 11 are connected to detectors 12. Each detector has an alarm code which is characterized by four digits plus a receiver number followed by three lines of 65 characters each that identify each specific location instantly when the information is transmitted over the phone lines 24 to the computer 25. The real time clock 17 allows the exact time and date each detector is actuated to be recorded on the memory and the computer 25 to assist in investigations of the fire or the actuation of the detector.

It should be clear at this point that an automatic fire alarm system has been provided with a wide variety of fail-proof features including automatic dialers which work on a low voltage and which automatically dial and transmit the information over the dialers to a central storage for further transmission and which reports to the central fire station. The low voltage allows an auxiliary battery power source to be connected through a relay for actuating the system anytime there is a failure in the line voltage. A rechargable battery, on the other hand, can be continuously recharged by the line voltage by using nicad or gel cell batteries. In addition, the detectors sound their own alarms as well as sounding an alarm at a central reporting station and operate on both smoke and heat for different types of fires. Smoke detectors are typically ionization detectors, while heat detectors detect rising heat or infrared and each is actuated under different conditions. It should be noted that the system may also be provided with a tamper switch 38 to indicate when the system has been tampered with. Thus, if the automatic dialers 11 fail to actuate, each detector will still sound its local alarm, and each dialer is actuated separately. Each telephone dialer 11 is a commercial unit which comes with voltage surge protection, and similarly, the central computer is provided with surge and lightening protection. Each detector 12 actuating the automatic dialers 11 is provided with a specific preprogrammed digital code in the PROM memory, which is added to the telephone number being dialed. Each digital code, in turn, indicates to the computer 25 precisely which detector has been actuated, which through the rapid search procedures of the computer 25 searching the disk 27 pinpoints the exact location of the detector on the floor plan and storage on the disk. That is to say, the computer searches for the matching string of digits to indicate, which it should be clear at this point, that an alarm system has been provided which is both automatic and fail-proof to a higher degree than conventional systems. Sequence of operations of this systems is as follows:

The smoke or heat detectors 12 cause a detector to sound its local alarms 13 and 14. A relay 18 is actuated upon the loss of the voltage in the line 16, or alternatively, the power supply 15 supplies the voltage to the automatic dialer which is actuated upon receiving a signal from any of the detectors 12 to automatically dial the computer 25 and the remote station terminal 31. The relay 20 contacts then make contact if there is a loss of line voltage. Local alarms are activated, including the alarm horns and strobes 13 and 14. The telephone electronic dialer 11, once activated, seizes the telephone line and dials the number preprogrammed into a ROM memory chip once a dial tone is detected. The automatic dialer transmits the digital information in the PROM memory to the central computer 25 which is activated to activate the disk as well as to transmit the information through the modem 28 over the line 30 to the remote terminal. The central receiver 31 sounds its built in alarm and compares the incoming digits for validity and can activate the printer 34, setting out the month, day of the month, hour, minute and second, as well as the alarm number for the specific detector 12. The central station receiver 31 then closes a set of building contacts which can automatically notify police stations, or the like.

The alarm monitor software of the present invention consists of two separate packages: the "MENU" program used to create and update the alarm codes and instructions and the "ALARM" program used to monitor and record all alarms received by the alarm receiver. To add, modify or delete alarm codes and instructions, the operator need only enter the menu routine by typing "RUN MENU". From that point on, the operator merely responds to the computer requests/prompts. The alarm data files are then updated with the correct information. The menu program, as well as the alarm monitor and time-of-day routines are stored on one disk drive and the alarm data is stored on the second drive. This allows for ease and convenience in backing-up the data files as well as incorporating program changes (updates).

When in the alarm monitor routine, the computer maintains the correct date/time which is continuously displayed on the screen to verify system operation status. A facility is incorporated to provide for "logging in" of the operator. The system maintains a historical log of the operator log-in date/time as well as the date/- time of receipt of all alarms. This log consists of both a printer log and a disk file log of all transactions. When an alarm is received, the alarm is received, the alarm code, date/time of receipt as well as the instructions, are displayed within three seconds on the computer screen. Upon receipt of an alarm, the computer requests and operator acknowledgement of the alarm. The date/time of the acknowledgement is also logged of the printer and disk. The computer interfaces with the computer interface unit in a "handshake" mode; i.e. all alarm codes are echoed back to the computer interface by the computer on a character-to-character basis to insure alarm code integrity.

It should be clear at this point that a fire alarm system which operates automatically and with fail-proof features have been provided, but it should also be clear that the invention is not to be considered as limited to the forms shown, which are to be considered illustrative rather than restrictive.

I claim:

1. An alarm system comprising in combination:
a plurality of automatic dialers positioned in a building and each being connected to a telephone line;
a plurality of detectors located in a building, each detector being connected to one of said plurality of automatic dialers for actuating said automatic dialer responsive to said detector being actuated and for generating detector information indicative of the location of said detector;
computer means having a central processing unit microprocessor and storage means therein operatively connected to each of said plurality of automatic dialers over telephone lines for receiving the detector information upon actuation of a detector and for storing and transmitting said detector information, said computer means storage means having additional stored information thereon including data indicating the floor plan of a portion of said building and the location of each detector on said building floor plan, said computer means having a coupling to the outside of a building for coupling to a portable terminal for displaying the detector information and the additional information indicating the location of each detector on said building floor plan without having to enter the building; and
a remote terminal for receiving stored computer information over a phone line from said computer storage means and adapted to receive and store detector information, indicating the location of each detector on said building plan whereby a central alarm system can alert a central station and provide stored information on detector location.

2. An alarm system in accordance with claim 1, in which said computer means includes a modem for transmitting data over telephone lines to said remote terminal for receiving computer information.

3. An alarm system in accordance with claim 2, in which said plurality of detectors includes a plurality of combination heat and smoke detectors.

4. An alarm system in accordance with claim 3, including at least one burglar detector connected to one of said plurality of automatic dialers for actuating said automatic dialer responsive to said burglar detector being actuated.

5. An alarm system in accordance with claim 1, in which said computer means storage means includes a hard disk driver for storing and accessing information thereon.

6. An alarm system in accordance with claim 1, in which each story of a building has at least one automatic dialer thereon and a plurality of detectors connected thereto.

7. An alarm system in accordance with claim 6, in which each detector includes an audible alarm operatively coupled thereto for warning occupants upon the actuation of said alarm.

8. An alarm system in accordance with claim 6, in which each of said plurality of detectors includes a strobe operatively coupled thereto for warning occupants therein of the actuation of said detector.

9. An alarm system in accordance with claim 1, in which each of said plurality of automatic dialers includes at least one rechargeable battery coupled thereto.

10. An alarm system in accordance with claim 9, in which each of said rechargeable batteries is coupled through a relay to a power line for actuation of said relay to cut in said rechargeable batteries upon the loss of power in said power line.

11. An alarm system in accordance with claim 10, in which each said automatic dialer includes a power supply connected to a power line.

12. An alarm system in accordance with claim 11, in which each said automatic dialer has a real time clock operatively coupled thereto.

* * * * *